US008235333B2

(12) United States Patent
Pfarr et al.

(10) Patent No.: US 8,235,333 B2
(45) Date of Patent: Aug. 7, 2012

(54) STABILIZATION SYSTEM FOR HIGH-PRESSURE WATER JET FEED LINE

(75) Inventors: Craig E. Pfarr, Issaquah, WA (US); Daniel F. Wilson, Mountlake Terrace, WA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 12/881,046

(22) Filed: Sep. 13, 2010

(65) Prior Publication Data

US 2010/0327126 A1 Dec. 30, 2010

Related U.S. Application Data

(62) Division of application No. 11/294,874, filed on Dec. 6, 2005, now Pat. No. 7,793,896.

(60) Provisional application No. 60/633,589, filed on Dec. 6, 2004.

(51) Int. Cl.
*F16L 3/00* (2006.01)

(52) U.S. Cl. ........................... 248/121; 248/49; 248/248

(58) Field of Classification Search .................. 248/121, 248/49, 248, 124.1, 125.7
See application file for complete search history.

(56) References Cited

U.S. PATENT DOCUMENTS

| | | | |
|---|---|---|---|
| 2,954,028 | A | 9/1960 | Smith |
| 4,515,278 | A | 5/1985 | DeVroom |
| 5,470,037 | A | 11/1995 | Willis |
| 5,505,653 | A | 4/1996 | Nedo |
| 5,921,443 | A | 7/1999 | McMillan |
| 6,685,154 | B1 | 2/2004 | Blyth |
| 7,793,896 | B2 | 9/2010 | Pfarr |

FOREIGN PATENT DOCUMENTS

| | | | |
|---|---|---|---|
| GB | 466109 | A | 5/1937 |
| GB | 789527 | A | 1/1958 |
| GB | 2176868 | A | 1/1987 |

*Primary Examiner* — Amy J Sterling
(74) *Attorney, Agent, or Firm* — Christensen O'Connor Johnson Kindness PLLC

(57) ABSTRACT

A support system (10) for stabilizing a high-pressure feed line (15) in a high-speed water jet food portioner, comprising a rigid span assembly (12) connected at one end to an extendable universal joint (40) that provides rotational motion around two axes (36, 37) as well as linear freedom along a third axis (38), and at the other end to a rod-end bearing (17) that permits motion about two axes at a fixed attachment point. The extendable universal joint (40) and the rod-end bearing (17) are each anchored to a fixed point, one on a portioner housing and the other on a cutting carriage such that the rigid span assembly (12) is allowed freedom at one end to move with the rapid and dramatically changing motion of the cutting carriage in order to provide support to the high-pressure feed line (15) mounted thereon, with minimal vibration.

7 Claims, 7 Drawing Sheets

STABILIZATION SYSTEM FOR HIGH-PRESSURE WATER JET FEED LINE

CROSS-REFERENCES TO RELATED APPLICATIONS

This application is a division of application Ser. No. 11/294,874, filed Dec. 6, 2005, now U.S. Pat. No. 7/793,896, which claims the benefit of Provisional Application No. 60/633,589, filed Dec. 6, 2004, the disclosures of which are incorporated herein by reference in their entirety.

BACKGROUND

This invention pertains to stabilization systems for lines spanning from one location to another, wherein the two locations are moveable relative to each other, and more specifically to a stabilization system for high-pressure fluid lines spanning between a first stationary location and a second moveable second location at a moveable work tool, and further to stabilization systems for high-pressure coil tubing for delivering high-pressure fluid to cutting heads of the water jet portioners.

High-pressure water jet cutting heads and feed systems are widely known in the field. Various systems provide a conduit for delivering the high-pressure fluid to the cutting head, which is mounted on a positioning carriage. The positioning carriage transports the cutting head along an x-axis and a y-axis, accessing an infinite number of points that define a two-dimensional plane over a cutting surface. The extreme speed at which the cutting head moves throughout the plane in order to make appropriate cuts on a work product on the cutting surface results in tremendous stresses on the components of the cutting head, the carriage, the control connections and leads, and the high-pressure feed line. The stresses caused by the movements result in failures of the components.

Various techniques are employed in order to diminish the stress and wear on the high-pressure feed line. Some of these techniques include providing coils in the feed line tubing at points that require movement, providing a support structure between the cutting containment housing and the cutting head, stabilizing the feed line tubing at movement points of the support structure. Complications still occur at both the connection points of the support structure and points where the feed line tubing contacts the support structure.

A relatively successful configuration includes polymer dampeners that secure the stabilization structure to a cutting containment housing and cutting head. Although this configuration provides sufficient range and freedom of motion, at the extremely high speeds at which the carriage and cutting head move, a certain amount of vibration still exists which, after time, results in feed line failures.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention is a support system for stabilizing a high-pressure feed line, while permitting necessary range of motion and speed of the cutting head mounted on a x- and y-axis positioning carriage. The support system provides for a support rod connected at one end by a precise, extendable universal joint that permits free movement around two axes, and that greatly reduces the level of vibration permitted in the rod after a movement motion. The support rod is connected at the other end by a precise pivotal point that permits free movement around two axes, and that also reduces the level of vibration permitted in the rod after a movement motion. Together the two connections greatly limit vibrations in the support rod created as a product of the cutting head carriage location motion.

The remaining vibration in the support rod and vibration in the feed line is dampened by securing the feel line adjacent to the support rod connection ends, and providing a dampener span tensioned between distal points along the feed line coil at either or both ends of the support rod.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
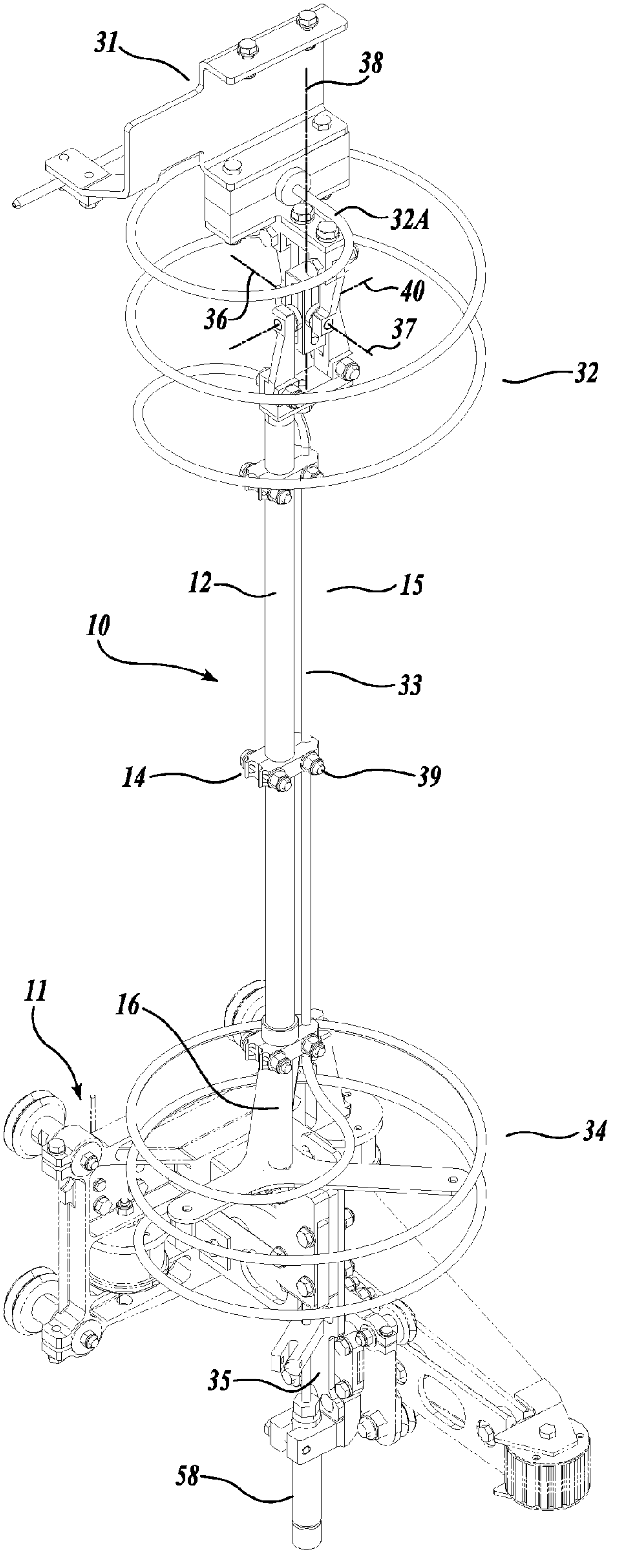
FIG. 1 is a perspective view of the feed line support assembly.
Figure 2:
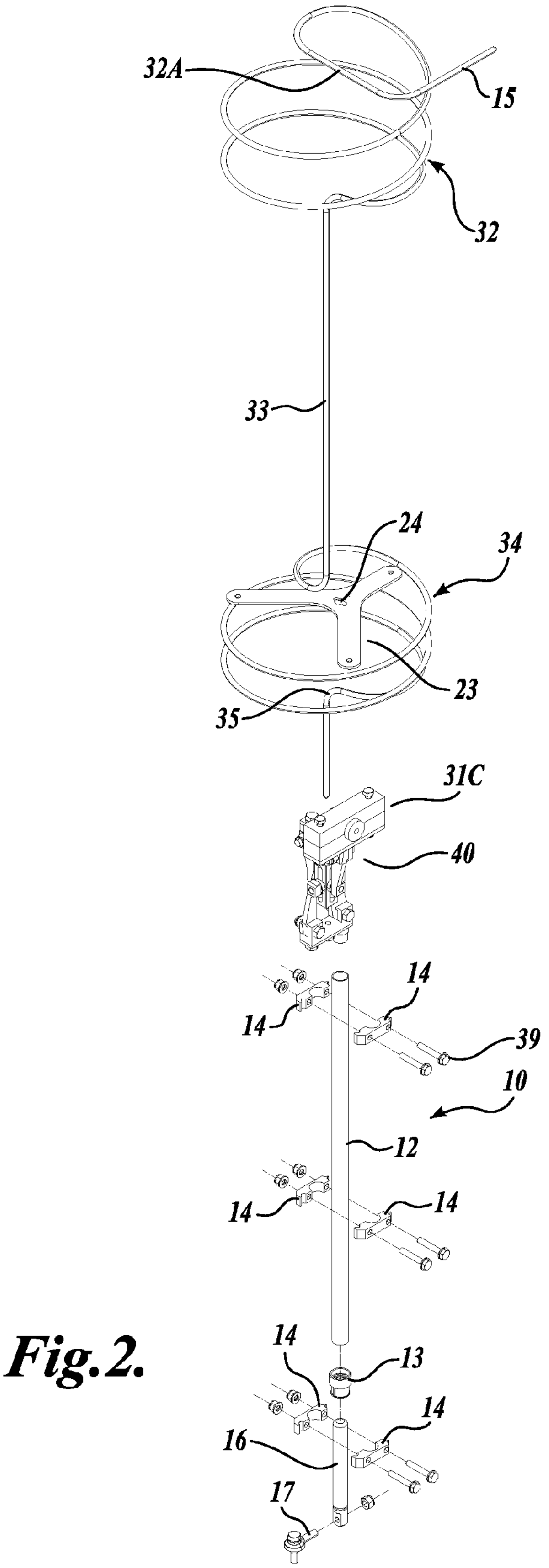
FIG. 2 is an exploded view of the feed line support assembly.
Figure 3:
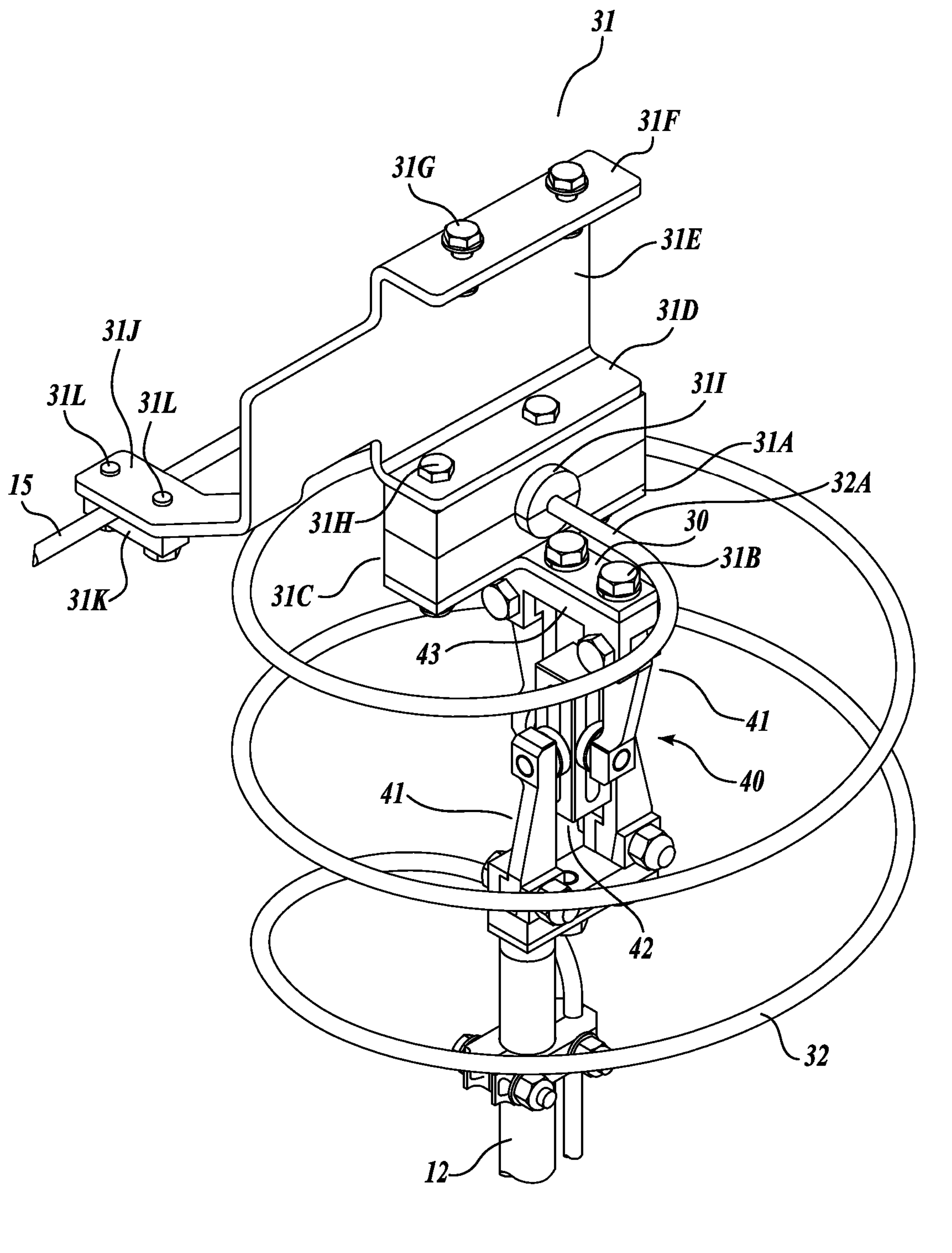
FIG. 3 is an enlarged perspective view of an upper portion of the feed line support assembly.

FIGS. 1 and 2 show the feed line and the support system. In the exemplary embodiment, feed line 15 is fabricated from a single length of high-strength, thick-walled stainless steel tubing. Exemplary feed line 15 is formed with two helical coil sections 32, 34 separated by a straight, longitudinal section 33. Each helical coil section 32, 34 allows feed line 15 to flex such that both ends of straight section 33 can move with two rotational degrees of freedom (analogous to a universal joint). In addition, each helical coil section 32, 34 allows feed line 15 to elongate through the length of each helical coil section 32, 34 along an axis through longitudinal section 33. This particular geometry allows top helical coil section 32 to be rigidly attached to a bracket assembly 31 of a portioner while bottom helical coil section 34 is rigidly attached to a cutting tool carriage 11 via a mounting plate 35.

Portioner cutting applications typically require the cutting carriage 11 to make a series of small, fast, abrupt moves. These fast moves excite vibration in feed line 15, which can cause metal fatigue and ultimately lead to catastrophic failure.

Vibrations in feed line 15, across top helical coil section 32, longitudinal section 33, and bottom helical coil section 34, may be suppressed by attaching longitudinal section 33 of feed line 15 to a support assembly or structure 10, as depicted in FIGS. 1 and 2. An exemplary support structure 10 consists of an elongated span member 12, with a pivot joint 40 mounted at one end, adjacent top helical coil section 32, and a telescoping piece 16, projecting from the other end of the span member, adjacent to bottom helical coil section 34. In the exemplary embodiment, span member 12 is a thin wall, lightweight, metal tube. Exemplary pivot joint 40 is a telescoping universal joint 40 that permits motion about two axes 36, 37, as well as elongation along a third axis 38. Telescoping piece 16 is extendably attached to span member 12 at one end, and a rod-end bearing 17 that permits motion about two axes is disposed at the other end of the telescoping piece. In the exemplary embodiment, rod-end bearing 17 is a spherical bearing. In the exemplary embodiment a plurality of clamps 14 securely and rigidly attach feed tube 15 to span member 12. The clamps are illustrated as being held in place relative to span member 12 and feed tube 15 by hardware members 39.

Figure 6:
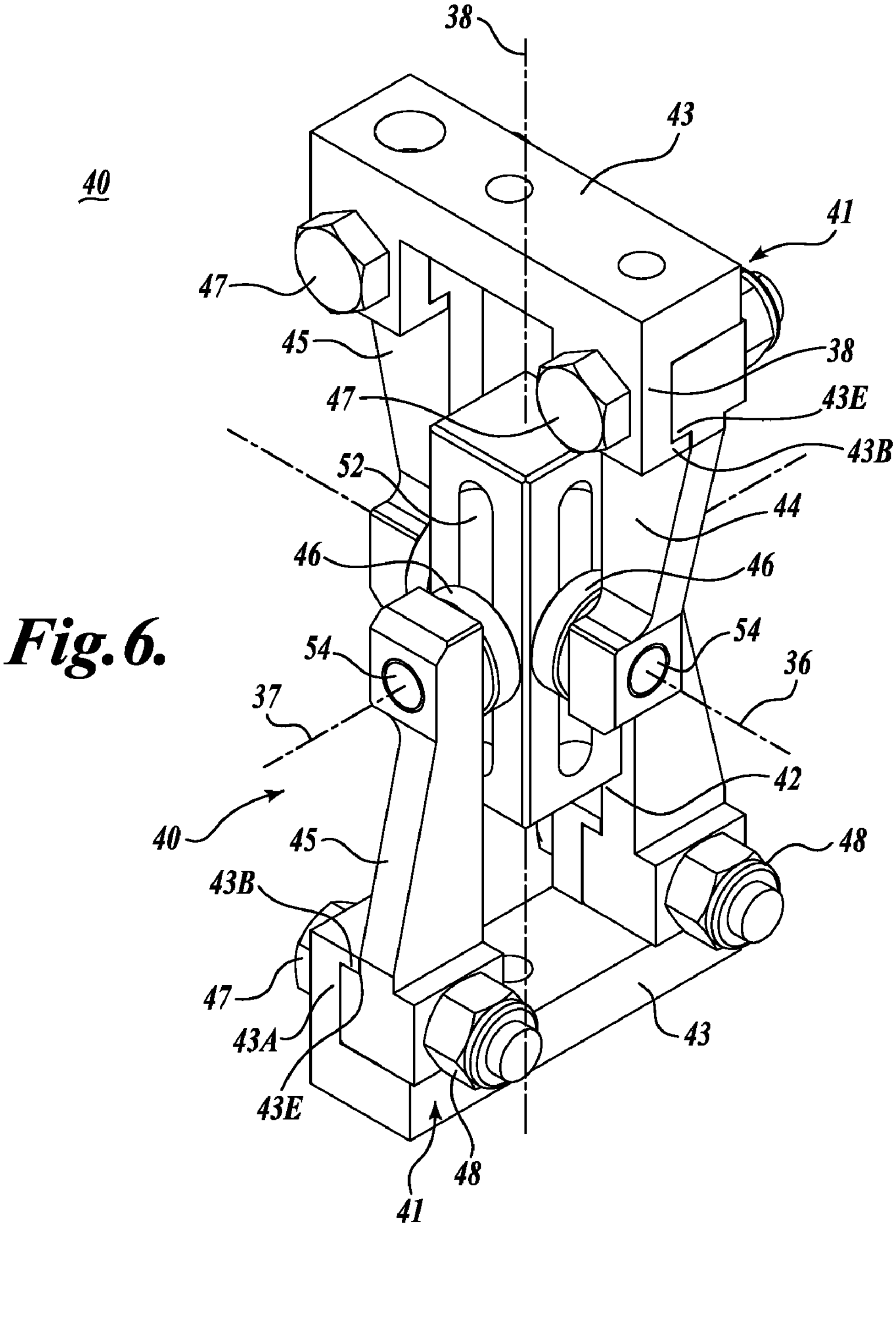
FIG. 6 is a perspective view of the telescoping universal joint.
Figure 7:
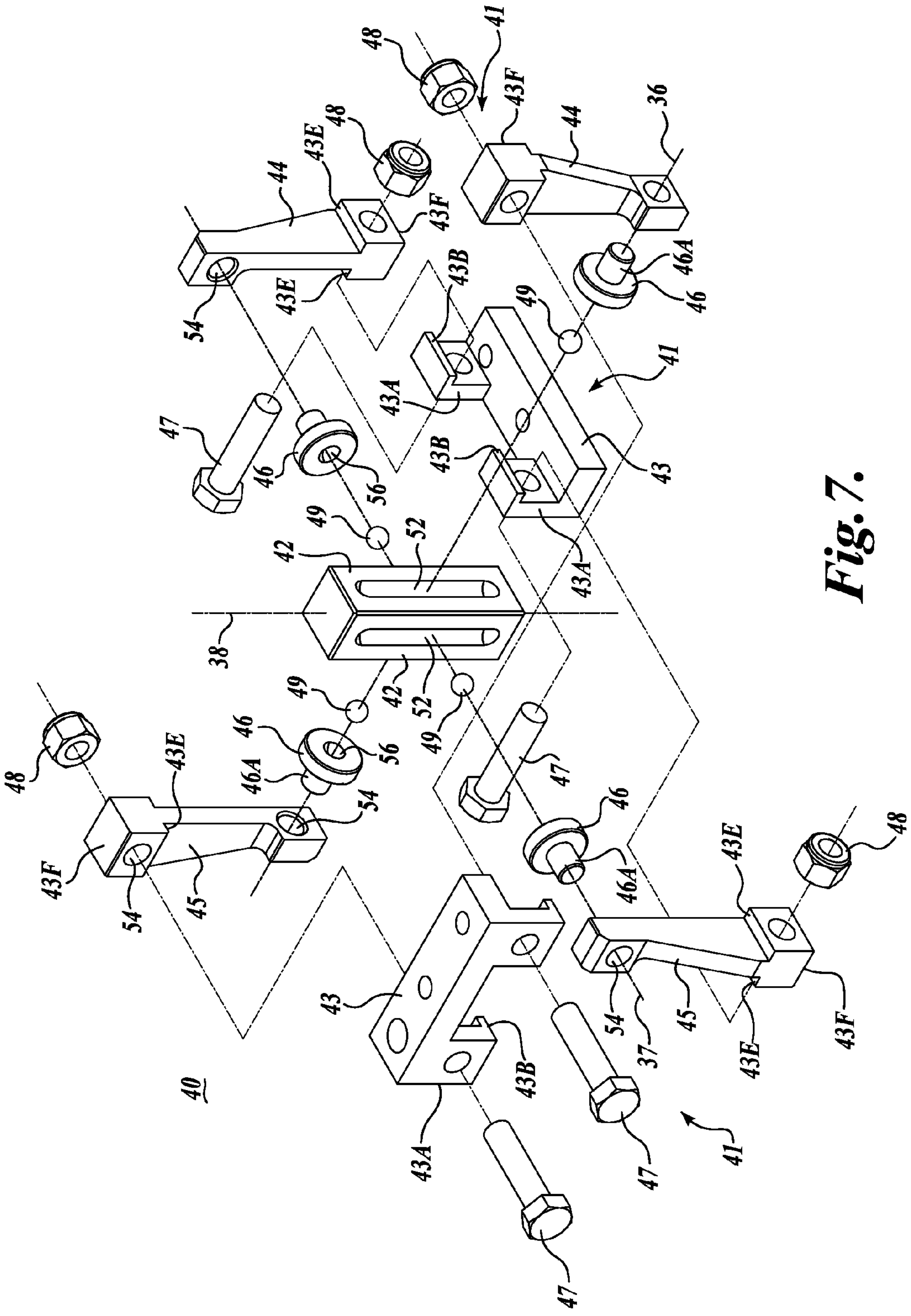
FIG. 7 is an exploded view of the telescoping universal joint.

Telescoping universal joint 40 is depicted in FIGS. 6 and 7. The exemplary embodiment consists of two identical U-shaped yoke assemblies 41 that contact a central spider block 42. The central spider block may be in the form of an elongate rectangular block. Each yoke assembly 41 has a base piece 43 and two yoke arms 44, 45 that may be attached to ears 43A projecting from base piece 43 with bolts 47 and lock nuts 48 or other types of hardware members. The yoke arms 44, 45 extend transversely from base piece 43 and are retained in position by lip portions 43B of ears 43A that closely overlap shoulders 43E formed at the proximal ends 43F of the yoke arms. It will be appreciated that by this construction, yoke arms 44, 45 are retained in position relative to the length of base piece 43.

Each yoke arm 44, 45 has a hole 54 at its distal end into which the shank portion 46A of bearing pad 46 may be press fit or otherwise retained. The bearing pads 46 may be generally in the shape of a circular disk, but other shapes such as octagonal, hexagonal or square can be used. Each bearing pad 46 has a central spherical seat 56 in its face opposite shank portion 46A that may accommodate a ball bearing 49. The bearing pads 46 are sized and positioned to mate against the longitudinal faces of the spider block 42. The ball bearings 49 slide in bowled raceways 52 extending along each longitudinal face of central spider block 42. With this geometry, central spider block 42 can translate relative to each yoke assembly 41 along axis 38 by virtue of ball bearings 49 rolling in the raceways 52 in spider block 42. In this regard, one yoke assembly 41 is nominally positioned at each end of the central spider block 42, with the yoke assemblies disposed 90° relative to each other in the manner of a typical universal joint. Central spider block 42 can also rotate about an axes 36, 37 defined by corresponding pairs of bearing pads 46. This geometry allows upper coil 32 two degrees of rotational freedom and one degree of translational freedom, but is constrained from vibrating, moving or rotating in any other directions.

The upper yoke assembly 41 of the universal joint 40 is mounted to the portioner by a bracket assembly 31. The bracket assembly 31 includes a connector plate 31A having a transverse portion 30 that overlaps the upper surface of yoke base piece 43 and is superiorly connected thereto via hardware members 31B, which may be in the form of threaded capscrews. The capscrews extend through clearance holes formed in the connector plate 31A to engage in threaded holes formed in the base piece 43 of the yoke assembly 41. The connector plate 31A also has a major plate portion that underlies a two-piece clamp block 31C, which in turn underlies the lower flange portion 31D of a formed bracket 31E. The formed bracket 31E also includes an upper flange portion 31F which is secured to the frame, housing or other portion of a cutting or portioning apparatus, not shown, via hardware members 31G which engage through clearance holes formed in the upper flange 31F. The clamp block 31C is composed of a lower half and an upper half that cooperatively define a transverse through-hole for snugly receiving the corresponding portion 32A of coil suction 32. The lower flange 31D, clamp block 31C and connector plate 31A are all clamped together by hardware members 31H that extend through clearance openings formed in each of the foregoing components. The clamp blocks 31C may include a generally cylindrically shaped snubber portion 31I that projects laterally from the clamp block to encircle and support the coil section 32A. The clamp block 31C may be composed of material having inherent shock absorbing properties so as to not transmit vibrations between the formed bracket 31E and the universal joint 40. The formed bracket 31E also includes a clamping arm 31J to support the adjacent portion of the feed line 15. A lower clamping block 31K supports the line 15 against the underside of clamping arm 31I and is held in position by hardware members 31L.

Universal joint 40 is designed for use in washdown environments, such as found in food processing plants. All of the parts may be made from stainless steel. Parts in rubbing contact with other parts (e.g., spider block 42, ball bearings 49, and bearing pads 46) may be made from different stainless steel alloys to minimize galling or other forms of abrasive wear. Contact surfaces between parts, which are difficult to keep clean in food processing areas, are kept to a minimum. Yoke arms 44, 45 may be designed to provide generous clearance to the central spider box 42 so it is easily washed with a water and/or steam stream (not shown). Other washdown-proof materials known in the field of food preparation (e.g., Delrin®) may be used.

The universal joint 40 is also designed to be easily maintained. Over time, the bearing pads 46, bearings 49 and the spider block 42 may wear. By loosening bolts 47, yoke arms 44, 45 may be repositioned to move bearing pads 46 closer to spider block 42 to accommodate minor wear. Also, the shank portions 46A of bearing pads 46 may be threadably engaged with yoke holes 54 so that the pressure of the bearing pads against the adjacent face of the spider block 42 may be adjusted. When bearing pads 46 "wear out," yoke arms 44, 45 may be removed and new bearing pads 46 may be installed. Also, central spider block 42 can be easily replaced when it is "worn out."

The bottom of span member 12 has a telescoping piece 16, which is held in place by a split bushing 13 and a pair of clamps 14. A rod-end spherical bearing 17 is mounted to the distal end of telescoping piece 16. Rod-end bearing 17 connects span member 12 to a cutting carriage 11 via intermediate telescoping extension piece 16. The extension piece 16 allows the pivot point of rod-end bearing 17 to be moved relative to the span member 12, which has been found important to accommodate changes in the water jet nozzle 58 height.

Figure 4:
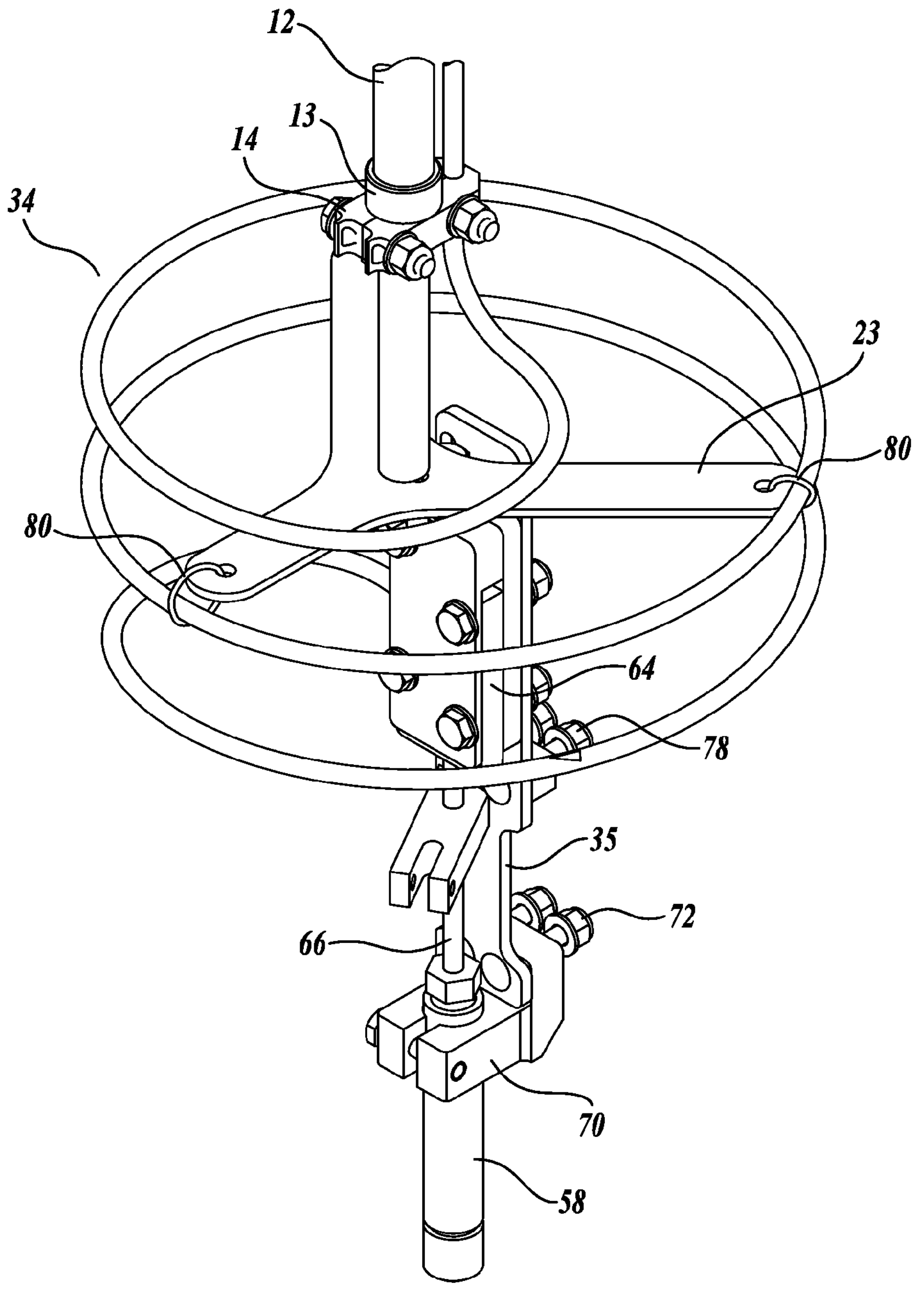
FIG. 4 is an enlarged perspective view of a lower portion of the feed line support assembly as viewed in the downstream direction.
Figure 5:
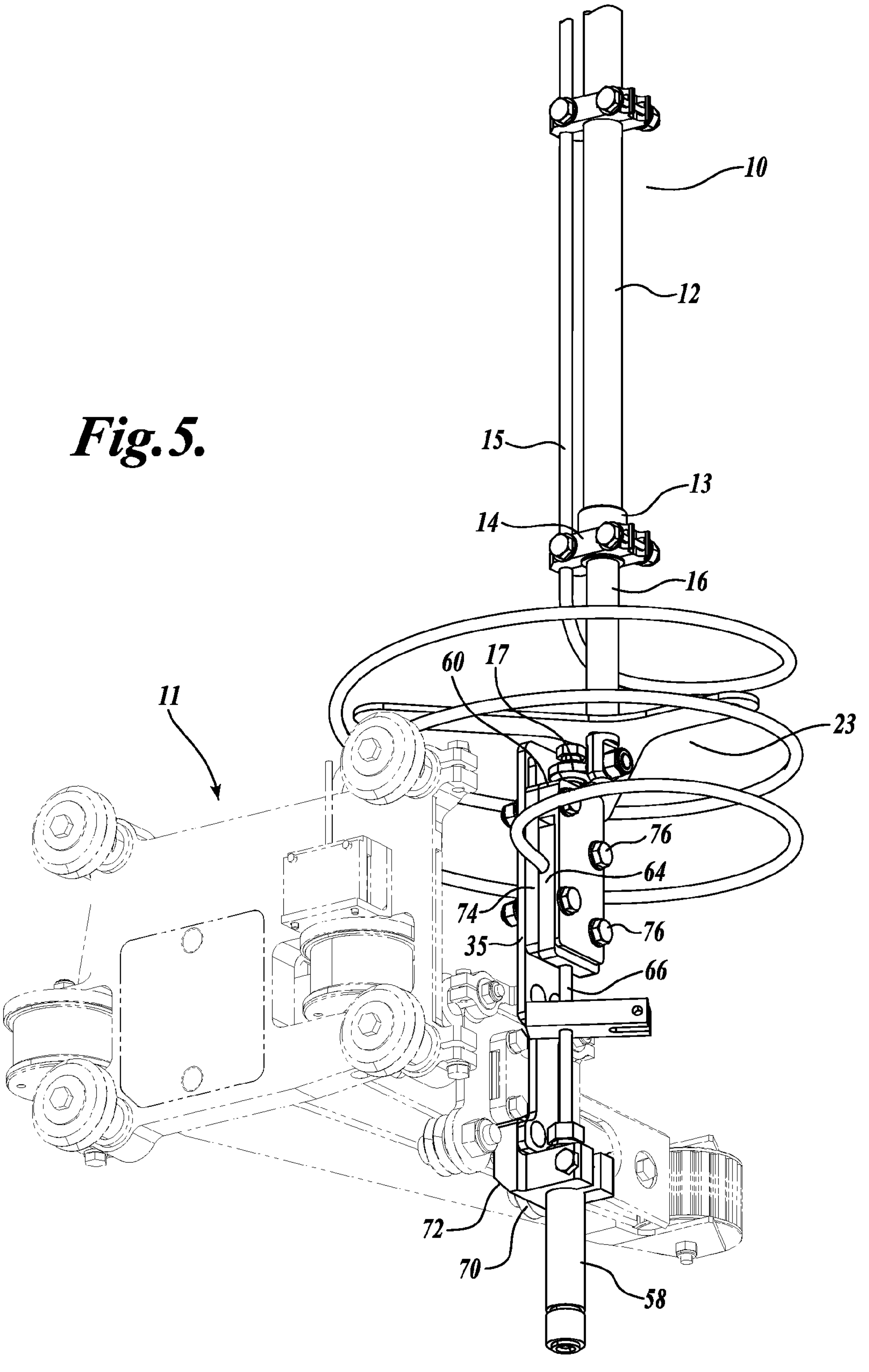
FIG. 5 is an enlarged perspective view of a lower portion of the feed line support assembly as viewed in an upward direction.

Referring to FIGS. 4 and 5, the rod end bearing 17 is interconnected between the distal end of telescoping piece 16 and a flange 60 extending transversely from the upper end portion of an upright, elongate, substantially flat mounting or connector plate 35. The lower end of coiled line 15 is engaged with a manifold block 64 having an internal passageway, not shown, leading to the upper end of a connector tube 66 extending downwardly from manifold block 64 and in fluid flow communication with line 15. The lower or distal end of the connector tube 66 is in fluid flow communication with the upper end portion of cutter nozzle 58, which is held in position by a clamp block 70 connected to the lower end portion of connector plate 35 by hardware members 72. A spacer block 74 spaces the manifold block 64 outwardly from the face of connector plate 35. The manifold block 64 and spacer plate 74 are secured to the upper portion of the connector plate 35 by hardware members 76. Hardware members 78, in addition to hardware members 72, are used to mount the connector plate 35 to a cutting tool carriage 11.

A dampener 23 provides relative radial support to a tube coil, such as helical coil sections 32, 34 of feed line 15. Dampener 23 is anchored at its center 24 to support structure 10. Exemplary dampener 23 is a flexible membrane that is attached to telescoping component 16 and is further attached to bottom helical coil section 34 at three points with tie wraps 80. Dampener 23 dampens vibration in coils of helical coil section 34. Exemplary dampener 23 may be constructed of thin (e.g., ⅛" thick) ultra-high-molecular-weight polymer or polyurethane, but those skilled in the art will appreciate other suitable materials. Dampener 23 is illustrated as composed of three spokes that radiate out from a central hub portion 24, but it will be appreciated that the dampener can be constructed in other shapes.

The foregoing disclosure and description of the invention is illustrative and explanatory thereof. Various changes in the details of the illustrated construction may be made within the scope of the appended claims without departing from the spirit of the invention. For example, the span member 12 may be in the form of a rod rather than a tube. Although the present invention has been described in conjunction with feed systems for high-pressure water jet cutting heads, the present invention can be utilized in other applications, including to stabilize high-pressure fluid lines spanning between a first location, which may be movable or stationary, and a second location at a movable work tool. Generally the present invention may also be used in conjunction with stabilizing lines spanning from one location to another location, wherein the two locations are movable relative to each other. The present invention should only be limited by the following claims and their legal equivalents.

While illustrative embodiments have been illustrated and described, it will be appreciated that various changes can be made therein without departing from the spirit and scope of the invention.

The embodiments of the invention in which an exclusive property or privilege is claimed are defined as follows:

1. A stabilizing system for a high-pressure liquid jet feed line for transmitting high-pressure liquid from a first location on a portioning apparatus to a second location on a high-pressure liquid jet cutter head, the cutter head moveable relative to the portioning apparatus during the transmission of high-pressure liquid through the high-pressure liquid jet feed lines to portion work products, the stabilizing system comprising:

(a) an elongate support structure to which a feed line is attachable, for stabilization of the feed line during use of the high-pressure liquid cutter head;

(b) a first pivot joint for connecting the support structure to the portioning apparatus;

(c) a second pivot joint for connecting the support structure, at a location distal on the support structure from the first pivot joint, to a cutter head;

(d) wherein the first pivot joint permitting the elongate support structure to pivot relative to a portioning apparatus about at least two axes of rotation as high-pressure liquid is being transmitted to a cutter head during operation of a cutter head to portion work products, said two axes of rotation being transverse to each other;

(e) wherein the second pivot joint permitting the elongate support structure to pivot relative to a cutter head about at least two axes of rotation as high-pressure liquid is being transmitted to a cutter head during operation of a cutter head to portion work products, said two axes of rotation being transverse to each other; and (f) an elongation joint incorporated into at least one of the first and second pivot joints, and the support structure, said elongation joint permitting the linear distance between the location at which the first pivot joint is connected to the portioning apparatus and the location that the second pivot joint is connected to the cutter head to move relatively closer together or move relatively further apart simultaneously with the angular movement about two transverse axes with rotation of the support structure relative to a portioning apparatus and a cutter head during operation of a cutter head to portion work products and the flow of high-pressure liquid through a liquid jet feed line, while preventing the support structure from pivoting about the length of the support structure.

2. The stabilizing system according to claim 1, wherein the elongation joint incorporated into the support structure, whereby the support structure being lengthwise extendable and contractible to alter the distance between the first and second pivot joints.

3. A stabilizing system for a high-pressure liquid jet feed line for transmitting high-pressure liquid from a first location on a portioning apparatus to a second location on a high-pressure liquid jet cutter head, the cutter head moveable relative to the portioning apparatus during the transmission of high-pressure liquid through the high-pressure liquid jet feed lines to portion work products; the stabilizing system comprising:

(a) an elongate support structure to which a feed line is attachable, for stabilization of the feed line during use of the high-pressure liquid cutter head;

(b) a first pivot joint for connecting the support structure to the portioning apparatus;

(c) a second pivot joint for connecting the support structure, at a location distal on the support structure from the first pivot joint, to a cutter head;

(d) wherein the first pivot joint permitting the elongate support structure to pivot relative to a portioning apparatus about at least two axes of rotation as high-pressure liquid is, being transmitted to a cutter head during operation of a cutter head to portion work products;

(e) wherein the second pivot joint permitting the elongate support structure to pivot relative to a cutter head about at least two axes of rotation as high-pressure liquid is being transmitted to a cutter head during operation of a cutter, head to portion work products;

(f) an elongation joint incorporated into at least one of the first and second pivot joints, said elongation joint permitting the linear distance between the first pivot member and the second pivot member to move relatively closer together or move relatively further apart simultaneously with the angular movement of the support structure relative to a portioning apparatus and a cutter head during operation of a cutter head to portion work products and the flow of high-pressure liquid through a liquid jet feed line; and (g) wherein the high-pressure fluid jet feed line is coiled adjacent at least one of the first and second pivot joints.

4. The stabilizing system according to claim 3, wherein the high-pressure liquid jet feed line is coiled about at least one of the first and second connection assemblies.

5. The stabilizing system according to claim 3, further comprising a dampener projecting from the support structure to the line coil, the dampener configured and composed to dampen movement of the line coil relative to the support structure.

6. The stabilizing system according to claim 1, wherein at least one of said first and second pivot joints comprising a first pivot member connectable to one of a portioning apparatus and high-pressure liquid jet cutter head, and a second pivot member connectable to the support structure, the first and second pivot members pivotable relative to each other about first and second pivot member axes of rotation but not about the length of the support structure, said first and second pivot member axes of rotation being transverse to each other, thereby enabling the elongate support structure to continuously pivot relative to at least one of a portioning apparatus and high-pressure liquid jet cutter head during operation of a cutter head and the flow of high-pressure liquid through the liquid jet feed line, but preventing the support structure from pivoting about the length of the support structure.

7. The stabilizing system according to claim 6, wherein said elongation joint permitting the linear distance between the first pivot member and the second pivot member to move relatively closer together or move relatively further apart simultaneously with the angular movement of the support structure about two transverse axes of rotation relative to a portioning apparatus and a cutter head during operation of a cutter head to portion work products and the flow of high-pressure liquid through a liquid jet feed line while preventing the support structure from pivoting about the length of the support structure.

* * * * *